United States Patent [19]

Kinoshita et al.

[11] 3,887,581

[45] June 3, 1975

[54] PROCESS FOR PRODUCING IMINOISOINDOLINONE

[75] Inventors: Shoichi Kinoshita, Omiya; Masaji Oyama, Ogose; Shunjiro Takijiri, Tokyo, all of Japan

[73] Assignees: Dainippon Ink & Chemicals Inc., Tokyo; Dainippon Ink Institute of Chemical Research, Saitama-ken, both of Japan

[22] Filed: Oct. 17, 1972

[21] Appl. No.: 298,392

[30] Foreign Application Priority Data

Oct. 19, 1971  Japan.............................. 46-82131

[52] U.S. Cl............................................ 260/325 Ph
[51] Int. Cl............................................ C07d 27/50
[58] Field of Search.................................. 260/325

[56] References Cited
UNITED STATES PATENTS
3,390,149   6/1968   Kranz et al. .................. 460/325 X OTHER PUBLICATIONS
Morrison et al. "Organic Chemistry" pp. 441, 481, 482 (1959).

*Primary Examiner*—Joseph A. Narcavage
*Attorney, Agent, or Firm*—Sherman & Shalloway

[57] ABSTRACT

A process for producing a 3-limino-haloisoindoline-1-one which comprises hydrolyzing a di-, tri- or tetra-halophthalonitrile in the presence of an alkali metal hydroxide or alkaline earth metal hydroxide.

10 Claims, No Drawings

PROCESS FOR PRODUCING IMINOISOINDOLINONE

This invention relates to a process for producing iminoisoindolinone, and more specifically, to a process for producing 3-imino-di, tri or tetra-haloisoindoline-1-ones or alkali metal salts or alkaline earth metal salts thereof, which are intermediates for producing valuable pigments having high fastness to sunlight.

Among the methods which have been known for producing 3-imino-haloisoindoline-1-ones are (1) a method comprising reacting a chlorinated product of a halogenated phthalimide with ammonia with or without prior hydrolysis of a part of the chlorinated product (Swiss Pat. No. 346,218), (2) a method comprising heating a halogenated phthalic anhydride with urea in nitrobenzene in the presence of ammonium molybdate (Swiss Pat. No. 346,218), and (3) a method comprising chlorinating a halogenated phthalic anhydride to form an ammonium salt of a cyanohalogenated benzoic acid, esterifying the resulting ammonium salt, and reacting the cyanohalogenated benzoic acid ester with ammonia or an alkali metal amide (Swiss Pat. No. 348,496, Swiss Pat. No. 363,980). Commercial performance of method (1), however, is extremely disadvantageous because of the long reaction process, the need for performing the reaction under moisture-free conditions, the use of corrosive material, the evolving of hydrogen chloride gas during the reaction, etc. According to method (2), the product contains an extremely small amount of the 3-imino-haloisoindoline-1-one, and great quantities of impurities exist, and therefore, the method fails to give desirable intermediates for producing pigments of good quality. Method (3) requires a long period of time before the cyanohalogenated benzoic acid ester is prepared, and also suffers from similar defects to those of method (1).

Accordingly, it is an object of this invention to provide a process for producing a 3-imino-haloisoindoline-1-one at low cost without involving the defects of the prior art methods described above, whereby isoindolinone pigments can be produced economically using the above product.

Other objects of the present invention will become apparent from the following description.

With a view to producing tetrachlorophthalamide, tetrachlorophthalonitrile was hydralized in the presence of an alkali metal hydroxide or alkaline earth metal hydroxide. Unexpectedly, the reaction gave 3-imino-tetrachloro-isoindoline-1-one and the corresponding metal salts in high yields. This reaction has not been disclosed in the literature, and is quite novel. The present invention is based on this reaction.

According to the present invention, there is provided a 3-imino-haloisoindoline-1-one by hydrolyzing a di-, tri- or tetra-halophthalonitrile in the presence of an alkali metal hydroxide or an alkaline earth metal hydroxide.

Examples of the di-, tri- or tetra-halophthalonitrile used as the starting material are 3,4-dichlorophthalonitrile, 3,5-dichlorophthalonitrile, 3,6-dichlorophthalonitrile, 4,5-dichlorophthalonitrile, 3,4,-5-trichlorophthalonitrile, 3,4,6-trichlorophthalonitrile, 3,4,5,6-tetrachlorophthalonitrile, 3,4-dibromophthalonitrile, 3,5-dibromophthalonitrile, 3,6-dibromophthalonitrile, 4,5-dibromophthalonitrile, 3,4,5-tribromophthalonitrile, 3,4,6-tribromophthalonitrile, 3,4,5,6-tetrabromophthalonitrile, 3,4-difluorophthalonitrile, 3,5-difluorophthalonitrile, 3,6-difluorophthalonitrile, 4,5-difluorophthalonitrile, 3,4,5-trifluorophthalonitrile, 3,4,6-trifluorophthalonitrile, and 3,4,5,6-tetrafluorophthalonitrile.

As the alkali metal hydroxide, there are exemplified hydroxides of lithium, sodium and potassium. Examples of the alkaline earth metal hydroxide are hydroxides of magnesium, calcium, strontium and barium. In place of these hydroxides, substances which form the alkali metal hydroxides or alkaline earth metal hydroxides by reaction with water can also be used in the present invention. Examples of such a substance are metals such as lithium, sodium, potassium, magnesium or calcium; hydrides such as lithium hydride, sodium hydride, potassium hydride, magnesium hydride, calcium hydride, strontium hydride, or barium hydride; peroxides such as lithium peroxide or sodium peroxide, oxides such as lithium oxide, sodium oxide, potassium oxide, magnesium oxide, calcium oxide, strontium oxide or barium oxide; nitrides such as lithium nitride, sodium nitride, potassium nitride, magnesium nitride, calcium nitride, strontium nitride or barium nitride; carbides such as lithium carbide, sodium carbide, potassium carbide, magnesium carbide, calcium carbide, strontium carbide or barium carbide; amides such as sodium amide; and alkoxides such as sodium methoxide or sodium ethoxide. Of these, the peroxides and the amides are especially desirable since on reaction with water in the reaction system, they form alkali metal hydroxides and at the same time, hydrogen peroxide and ammonia are evolved, and the hydrogen peroxide and ammonia act as reaction promoters. The amount of the hydroxide used is not particularly limited. However, where high yields are desired, the hydroxide must be used in an amount at least equivalent to the starting halogenated phthalonitrile.

The hydrolyzing reaction is carried out usually at a temperature of 10° to 100°C. although the temperature may vary according to the type of the reaction system. The time required for the reaction is from 0.5 to 40 hours. The reaction is completed within shorter periods of time by employing the alkali metal hydroxide and an elevated temperature below 100°C. rather than by using the alkaline earth metal hydroxide and room temperature.

In order to carry out the reaction more advantageously, the reaction components are preferably in the dissolved or finely dispersed state in a diluent or solvent, or the two liquid phases are preferably in the emulsified state. Examples of the diluent or solvent that can be used for this purpose are alcohols such as methanol, ethanol or ethylene glycol; ketones such as acetone, methyl ethyl ketone or cyclohexanone; ethers such as ethyl ether, ethyl isopropyl ether, or dioxane; aliphatic hydrocarbons such as hexane, heptane or cyclohexane; aromatic hydrocarbon such as benzene, toluene, xylene or chlorobenzene; halogenated hydrocarbons such as chloroform, carbon tetrachloride or tetrachloroethane; organic bases; dimethyl sulfoxide; and hexamethyl phosphoramide. Hydrogen peroxide or ammonia may further be used as a promoter for the reaction.

The 3-imino-di-, tri-or tetra-haloisoindoline-1-one, (the product of the method of this invention) contains alkali metal salt or alkaline earth metal salt in an amount corresponding to the extent of the hydrolysis, unless the hydrolysis has proceeded completely. When this product is used for producing pigments, the presence of the metal salts does not become detrimental in any way.

Where it is desired to obtain only the alkali metal salt or alkaline earth metal salt of 3-imino-di-, tri- or tetra-haloisoindoline-1-one, the di-, tri- or tetra-halophthalonitrile is reacted in accordance with one embodiment of the present invention with an alkali metal hydroxide or alkaline earth metal hydroxide under conditions such as not to induce hydrolysis. In order to carry out this reaction easily and smoothly, alcohols are preferably used as a reaction medium.

The alkali metal salt or alkaline earth metal salt of the 3-imino-di-, tri- or tetra-haloisoindoline-1-one is readily hydrolyzed by treatment with a dilute acid to form free 3-imino-di-, tri-or tetra-haloisoindoline-1-one.

The following Examples illustrate the invention. Unless otherwise specified, all percentages are by weight.

EXAMPLE 1

A flask was charged with 10 g of sodium hydroxide, 25 g of water, and 150 g of ethanol. After thorough mixing, 20 g of 3,4,5,6-tetrachlorophthalonitrile was added. The mixture was stirred for 5 hours at 70° to 78°C., and then cooled to room temperature. The reaction mixture was suction filtered, and washed thoroughly with water to afford 17 g of the product. The product was identified by infrared absorption spectroscopy and elemental analysis to be a mixture of 3-imino-4,5,6,7-tetrachloroisoindoline-1-one and its sodium salt.

15 g of this product was boiled for several hours with stirring in a mixture of 3,3'-dimethoxybenzidine and glacial acetic acid by a customary method, suction filtered, and washed to form 13.5 g of a red orange pigment. This pigment corresponded in infrared absorption spectrum and elemental analysis values with a bis-(tetrachloro-isoindoline-1-one-3-ylideneimino)-aryl pigment produced by a known method using 3,3'-dimethoxybenzidine.

EXAMPLE 2

A flask was charged with 400 g of water, 12 g of sodium hydroxide, and then 400 g of isopropanol. 39.5 g of 3,6dichlorophthalonitrile was added, and the mixture was stirred for 2 hours at 40°C., cooled, and suction filtered. The cake was washed with water, and 400 g of a 5% aqueous solution of acetic acid were added. The mixture was stirred, suction filtered, washed with water and then with isopropanol, and air dried. The amount of the product was 37 g. It was confirmed by elemental analysis values and infrared absorption spectrum that the product was 3-imino-4,7-dichloroisoindoline-1-one.

When this product was boiled in glacial acetic acid together with 4,4'-diaminodiphenyl, a yellow pigment was produced. This pigment corresponded with the infrared absorption spectrum of a yellow azomethine pigment produced by a known method involving heating 3,3,4',7-tetrachloro-isoindoline-1-one and 4,4'-diaminodiphenyl in nitrobenzene.

EXAMPLE 3

A flask was charged with 100 g of water, 4 g of potassium hydroxide and then 100 g of acetone, and the mixture was thoroughly stirred. Then, 12 g of 3,4,6-trichlorophthalonitrile (containing 3,4,6-trichlorophthalimide as an impurity) was added, and the mixture was stirred for several hours at room temperature, and cooled. 100 g of a 5% aqueous solution of acetic acid was added, and after stirring for a while, the mixture was immediately suction filtered, followed by washing with water and then with acetone.

The washed cake was heated in acetic acid for several hours together with p-phenylene diamine, hot filtered, and washed several times with hot acetic acid and then with ethanol and acetone to yield a yellow pigment.

This pigment corresponded in its infrared absorption spectrum with a pigment produced by reacting 3-imino-4,5,7-trichloro-isoindoline-1-one prepared from methyl 3,4,6-trichloro-2-cyanobenzoate and ammonia, with phenylene diamine in acetic acid in a customary manner.

EXAMPLE 4

A flask was charged with 100 g of water, 9 g of sodium hydroxide, and then 400 g of acetone, followed by addition of 53.2 g of 3,4,5,6-tetrachlorophthalonitrile. The mixture was stirred for one hour at 45°C. and then cooled. After suction filtering, the mixture was washed with water and then with acetone. The resulting cake weighed 59 g.

When 58 g of this cake and 37 of 3,3'-dimethoxybenzidine were boiled in 1800 g of glacial acetic acid, 53 g of a red orange azomethine pigment was obtained. This pigment corresponded in infrared absorption spectrum with the pigment obtained in Example 1.

EXAMPLE 5

A flask was charged with 100 g of water, 7 g of sodium hydroxide, and then 200 g of 28 % ammonia water, followed by addition of 13.3 g of 3,4,5,6-tetrachlorophthalonitrile. The mixture was stirred for 20 hours at 20° – 30°C. while introducing ammonia gas. The reaction mixture was suction filtered, and the cake was washed with water and dried in vacuo to yield 15.0 g of a light yellow product. By elemental analysis and infrared absorption spectroscopy, this product was identified as a mixture of 3-imino4,5,6,7-tetrachloroisoindoline-1-one and its sodium salt.

EXAMPLE 6

A flask was charged with 400 g of water, 12.6 g of lithium hydroxide and then 400 g of isopropanol. At 40° – 45°C., 53.2 g of 3,4,5,6-tetrachlorophthalonitrile was added, and the mixture was stirred for one hour at this temperature. The mixture was then cooled, and 400 g of a 5 % aqueous solution of acetic acid was added. The reaction mixture was suction filtered, washed with water and then with acetone, and dried to yield 46.5 g of 3-imino-4,5,6,7-tetrachloroisoindoline-1-one. This product corresponded in infrared absorption spectrum with a product obtained in accordance with the known method of saturating a methanol solution of a methyl ester of 3,4,5,6-tetrachloro-2-cyanobenzoic acid with ammonia gas.

EXAMPLE 7

23.2 g of sodium peroxide was added carefully to 400 g of stirred water while cooling, followed by adding 400 g of isopropanol and then 53.2 g of 3,4,5,6-tetrachlorophthalonitrile. The mixture was heated to 40°C., and stirred for 2 hours at 40° – 50°C. Subsequently, the mixture was treated under the same conditions as set forth in Example 6, and the same results were obtained.

EXAMPLE 8

A flask was charged with 40 g of sodium hydroxide, 150 g of water, and then 350 g of benzene. Further, 40 g of 3,4,5,6-tetrachlorophthalonitrile was added, and the mixture was boiled under reflux with thorough stirring. With the progress of the reaction, a white precipitate became suspended. After heating for 30 hours, the reaction mixture was cooled, and suction filtered. The precipitate was filtered, washed with water, and air drired to yield 41.5 g of a mixture of 3-imino-4,5,6,7-tetrachloroisoindoline-1-one and its sodium salt. The filtrate was separated into fractions. The benzene layer was washed with water, and concentrated to recover 3 g of 3,4,5,6-tetrachlorophthalonitrile.

The 3-imino-4,5,6,7-tetrachloroisoindoline-1-one and its sodium salt were reacted by a known method with 3,3'-dimethoxybenzidine. The same red orange pigment as in Example 1 was obtained.

EXAMPLE 9

A flask was charged with 200 g of water, 32 g of barium hydroxide, and after thorough stirring, with 200 g of isopropanol. Further, 26.6 g of 3,4,5,6-tetrachlorophthalonitrile was added, and the mixture was heated at 40° – 45°C. for 15 hours with stirring. The reaction mixture was cooled, and the precipitate was suction filtered and washed with water. The washed precipitate was put in 300 g of a 5 % aqueous solution of acetic acid, and the mixture was stirred, suction filtered, washed with water and acetone, and dried to yield 24.5 g of a final product. The product was identified by infrared absorption spectroscopy to be 3-imino-4,5,6,7-tetrachloroisoindoline-1-one.

28.7 g of barium oxide was added carefully with stirring to 200 g of cooled water, and a further 200 g of isopropanol was added. The mixture was treated in the same way as set forth above, and similar results were obtained.

EXAMPLE 10

A flask was charged with 250 g of water and 13.3 g of strontium hydroxide. With rapid stirring, the mixture was heated to 40° – 50°C., and 100 g of isopropanol was added gradually. Then, 13.3 g of 3,4,5,6-tetrachlorophthalonitrile was added, and the mixture was stirred for 30 hours at this temperature. The reaction mixture was then cooled, and 140 g of a 5 % aqueous solution of acetic acid was added. The reaction mixture was suction filtered, washed with water and then with acetone, and air dried. By infrared absorption spectroscopy, the product was identified as 3-imino-4,5,6,7-tetrachloroisoindoline-1-one. When this product was heated in glacial acetic acid together with 3,3'-dimethoxybenzidine, the same red orange pigment as in Example 1 was obtained.

EXAMPLE 11

30 g of a 28 % methanol solution of sodium methoxide was added gradually with stirring to 200 g of cooled isopropanol (88 % isopropanol), and then 200 g of water was added. Further, 26.6 g of 3,4,5,6-tetrachlorophthalonitrile was added. The mixture was stirred for 4 hours at 40°C. To the reaction mixture, 250 g of 5 % acetic acid was added, and the mixture was stirred. The precipitate formed was suction filtered, washed with water and dried to yield 22 g of light yellow powder. This product was identified as 3-imino-4,5,6,7-tetrachloroisoindoline-1-one by the mass spectrum and infrared absorption spectrum.

EXAMPLE 12

A four-necked flask equipped with a stirrer, condenser, dropping funnel and thermometer was charged with 13 g of 3,4,5,6-tetrachlorophthalonitrile, 125 g of ethanol, 125 g of water and 30 ml. of a 30 % aqueous solution of hydrogen peroxide, and the mixture was heated to 50°C. with stirring. While maintaining the temperature at 50°C., 8 ml. of a 25 % aqueous solution of sodium hydroxide was added dropwise, and the mixture was stirred at 50°C. for an additional 3 hours. The reaction mixture was allowed to cool for 20 hours, and the precipitate formed was suction filtered, followed by washing with water and then with acetone and drying to yield 12.1 g of a product. This product was identified by infrared absorption spectroscopy as a mixture of 3-imino-4,5,6,7-tetrachloroisoindoline-1-one and its sodium salt.

EXAMPLE 13

A flask was charged with 100 g of water, 3 g of sodium hydroxide and 100 g of acetone. Further, 22.2 g of 3,4,5,6-tetrabromophthalonitrile was added, and the mixture was stirred for 3 hours at 40° – 60°C., and the mixture was cooled. 100 g of a 5 % aqueous acetic acid was added, and the mixture was stirred. The precipitate formed was suction filtered, washed with water and then with a small amount of acetone, and dried to yield 12 g of 3-imino-4,5,6,7-tetrabromo-isoinsoline-1-one. The identification of the product was performed by elemental analysis and infrared absorption spectroscopy.

EXAMPLE 14

10 g of sodium hyroxide and 40 g of 3,4,5,6-tetrachlorophthalonitrile were added to 700 g of anhydrous ethanol, and the mixture was heated at 75°C. for 7 hours with stirring. The reaction mixture was cooled to room temperature. The precipitate formed was suction filtered, washed with toluene and then with anhydrous ethanol, and dried to yield 20 g of a product. The product was identified as a sodium salt of 3-imino-4,5,6,7-tetrachloroisoindoline-1-one by elemental analysis and infrared absorption spectroscopy.

450 g of a 5 % aqueous solution of acetic acid was added to the product, followed by stirring, filtering and washing with water to yield 3-imino-4,5,6,7-tetrachloroisoindoline-1-one.

EXAMPLE 15

To 1000 g of anhydrous methanol were added 23 g of potassium hydroxide and 53.2 g of 3,4,5,6-tetrachlorophthalonitrile, and the mixture was heated at 50°C. for 10 hours. The reaction mixture was cooled to room temperature, and 550 g of a 5 % aqueous solution of acetic acid was added. After slow stirring, the precipitate formed was suction filtered, washed with water and then with methanol, toluene and methanol in that order. The product was identified as 3-imino-4,5,6,7- tetrachloroisoindoline-1-one by infrared absorption spectroscopy.

What we claim is:

1. A process for producing 3-imino-, di-, tri-, or tetra-haloisoindoline-1-one metal salts which comprises reacting a di-, tri-, or tetra-halophthalonitrile in the presence of an alkali metal hydroxide, an alkaline earth metal hydroxide, or a compound forming such hydroxides by reaction with water, at a temperature of from 10 to 100°C for a time of from 0.5 to 40 hours.

2. The process of claim 1 in which the reaction components are dissolved or finely dispersed in a diluent or solvent selected from one of the group comprising: alcohols, ketones, ethers, aliphatic hydrocarbons, aromatic hydrocarbons, halogenated hydrocarbons, and organic bases.

3. The process of claim 2 in which the diluent or solvent is alcohol.

4. The process of claim 2 in which hydrogen peroxide or ammonia is added as a reaction promoter.

5. The process of claim 1 in which an alkali metal hydroxide or a compound forming such hydroxide by reaction with water is employed, and the reaction temperature is above room temperature.

6. The process of claim 1 in which the compound forming hydroxides by reaction with water is employed, and is a peroxide or an amide.

7. The process of claim 1 in which the 3-imino-di-, tri-, or tetra-haloisoindoline-1-one metal salt is further reacted with dilute acetic acid to eliminate the metallic moiety.

8. The process of claim 1 in which the hydroxide or hydroxide forming compound is present in an amount at least equivalent to the halophthalonitrile.

9. The process of claim 1 in which the reaction is carried out under hydrolysis conditions and continued until hydrolysis is complete, thus eliminating the metallic moiety.

10. The process of claim 1 in which the alkali metal hydroxide, alkaline earth hydroxide, or compound forming such hydroxides by reaction with water is selected from the group comprising: sodium hdyroxide, potassium hydroxide, lithium hydroxide, sodium peroxide, barium hydroxide, strontium hydroxide, and sodium methoxide.

* * * * *